(12) United States Patent
Maliszewski et al.

(10) Patent No.: US 9,172,528 B2
(45) Date of Patent: *Oct. 27, 2015

(54) METHOD AND APPARATUS FOR ALLOWING SOFTWARE ACCESS TO NAVIGATIONAL DATA IN A DECRYPTED MEDIA STREAM WHILE PROTECTING STREAM PAYLOADS

(71) Applicant: INTEL CORPORATION, Santa Clara, CA (US)

(72) Inventors: Richard Maliszewski, Forest Grove, OR (US); Keith L. Shippy, Tempe, AZ (US); Ajit P. Joshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/249,217

(22) Filed: Apr. 9, 2014

(65) Prior Publication Data

US 2014/0223180 A1    Aug. 7, 2014

Related U.S. Application Data

(63) Continuation of application No. 13/734,164, filed on Jan. 4, 2013, now Pat. No. 8,739,307, which is a continuation of application No. 12/586,618, filed on Sep. 23, 2009, now Pat. No. 8,363,831.

(51) Int. Cl.
*H04L 9/34*    (2006.01)
*H04L 9/00*    (2006.01)
(Continued)

(52) U.S. Cl.
CPC .............. *H04L 9/00* (2013.01); *H04L 63/0428* (2013.01); *H04N 5/913* (2013.01); *H04N 7/1675* (2013.01);
(Continued)

(58) Field of Classification Search
CPC ....... H04N 21/439; H04L 69/22; H04H 60/73
See application file for complete search history.

(56) References Cited

U.S. PATENT DOCUMENTS 6,186,405 B1    2/2001  Yoshioka
7,117,365 B1    10/2006 Rump et al.
(Continued)

FOREIGN PATENT DOCUMENTS

| CN | 1685659 A | 10/2005 |
|---|---|---|
| CN | 1711524 A | 12/2005 |

(Continued)

OTHER PUBLICATIONS

Office Action mailed Jun. 30, 2014 for Chinese Application No. 201010534872.8, 7 pages.
(Continued)

*Primary Examiner* — Venkat Perungavoor
(74) *Attorney, Agent, or Firm* — Schwabe, Williamson & Wyatt, P.C.

(57) ABSTRACT

A method, apparatus and system enabling software access to navigational data in a decrypted media stream while protecting stream payloads. In one embodiment, a filter may route an encrypted content stream and associated information to a secure partition having a trusted computing component for decryption. Upon decryption, the trusted computing component may store the decrypted payload of the content in a secure storage location accessible to the trusted computing component. Thereafter, the decrypted navigational header information of the content may be used to navigate to the decrypted content via a trusted component such as a trusted rendering unit in the secure partition.

25 Claims, 4 Drawing Sheets

(51) Int. Cl.
  *H04L 29/06* (2006.01)
  *H04N 5/913* (2006.01)
  *H04N 7/167* (2011.01)
  *H04N 21/432* (2011.01)
  *H04N 21/4405* (2011.01)
  *H04N 21/443* (2011.01)
  *H04N 21/4627* (2011.01)
  *H04N 21/845* (2011.01)
  *H04L 9/18* (2006.01)

(52) U.S. Cl.
  CPC ......... *H04N 21/4325* (2013.01); *H04N 21/443* (2013.01); *H04N 21/44055* (2013.01); *H04N 21/4627* (2013.01); *H04N 21/8455* (2013.01); *H04N 2005/91364* (2013.01)

(56) References Cited

U.S. PATENT DOCUMENTS

| | | | |
|---|---|---|---|
| 7,177,520 B2 * | 2/2007 | Zetts | 386/281 |
| 7,853,613 B2 | 12/2010 | Kudo | |
| 2002/0107973 A1 * | 8/2002 | Lennon et al. | 709/231 |
| 2004/0078357 A1 * | 4/2004 | LaChapelle et al. | 707/2 |
| 2004/0088557 A1 | 5/2004 | Malcolm et al. | |
| 2005/0013589 A1 * | 1/2005 | Shah et al. | 386/94 |
| 2005/0068952 A1 * | 3/2005 | Deiss et al. | 370/389 |
| 2006/0047722 A1 * | 3/2006 | Walker et al. | 707/204 |
| 2007/0177591 A1 | 8/2007 | Horton et al. | |
| 2007/0233602 A1 | 10/2007 | Zweig et al. | |
| 2009/0060181 A1 | 3/2009 | Eye et al. | |
| 2009/0290580 A1 * | 11/2009 | Wood et al. | 370/389 |

FOREIGN PATENT DOCUMENTS

| | | |
|---|---|---|
| EP | 0674440 A2 | 3/1995 |
| JP | 2004158936 A2 | 6/2004 |

OTHER PUBLICATIONS

Bremler-Barr et al., "Accelerating Multi-Patterns Matching on Compressed HTTP Traffic", IEEE INFOCOM(2009), 9 pages.

Search Report from European Patent Application No. 10251625.9 issued Jan. 4, 2011, 3 pages.

Office Action issued Dec. 6, 2011 from Japanese Patent Application No. 2010-209096, 11 pages.

Final Notification of Reason(s) for Refusal mailed Mar. 21, 2012 from Japanese Application No. 2010-209096, 11 pages.

Office Action mailed May 30, 2012 from European Application No. 10251625.9, 4 pages.

Office Action issued Dec. 6, 2012 from Chinese Patent Application No. 201010534872.8, 18 pages.

Office Action mailed Jun. 5, 2013 for European Patent Application No. 10251625.9, 4 pages.

Office Action issued Jun. 24, 2013 from Chinese Patent Application No. 201010534872.8, 8 pages.

Office Action issued Nov. 14, 2013 from Chinese Patent Application No. 201010534872.8, 8 pages.

* cited by examiner

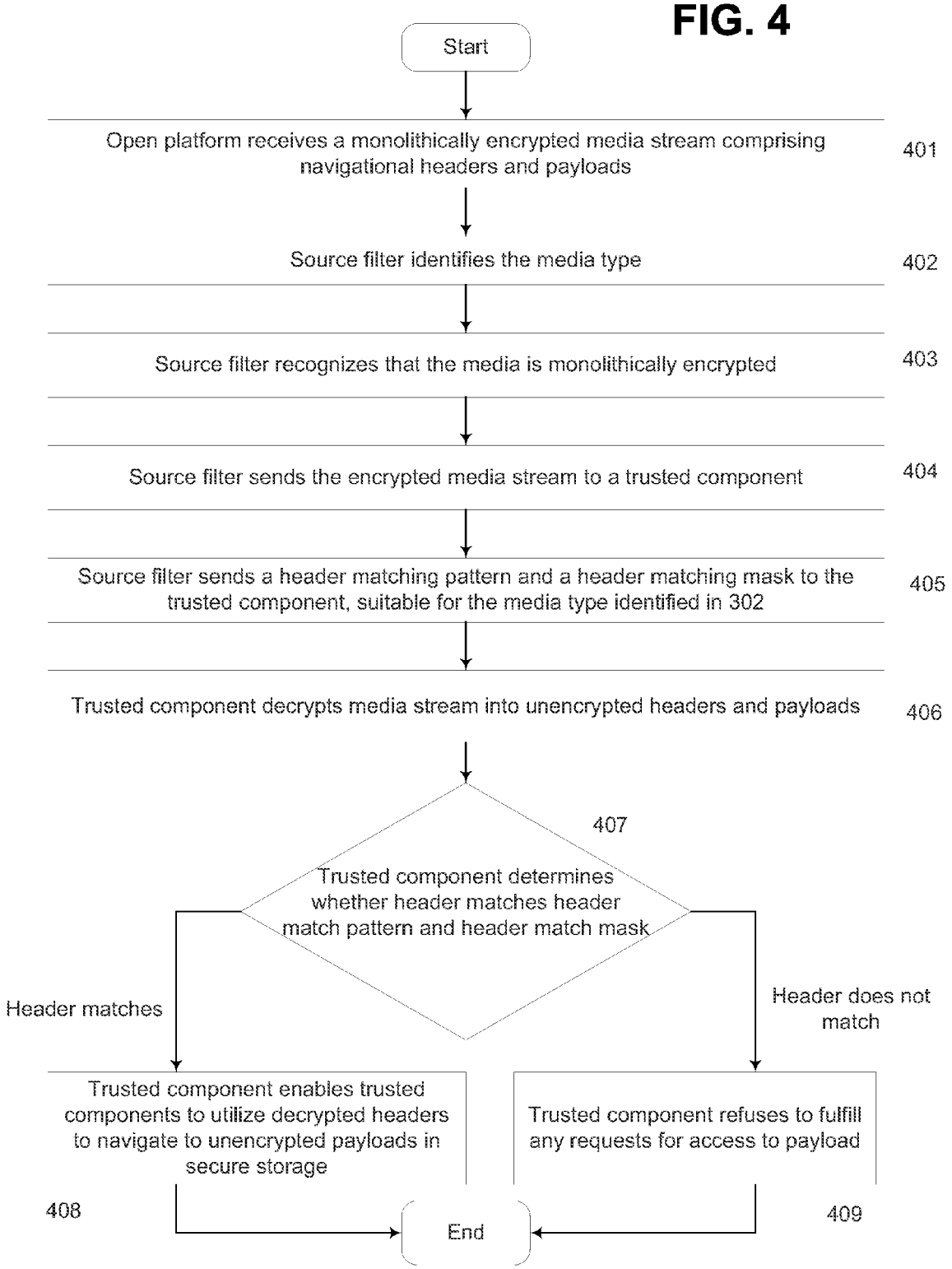

METHOD AND APPARATUS FOR ALLOWING SOFTWARE ACCESS TO NAVIGATIONAL DATA IN A DECRYPTED MEDIA STREAM WHILE PROTECTING STREAM PAYLOADS

CROSS REFERENCE TO RELATED APPLICATIONS

The present application is a continuation of U.S. patent application Ser. No. 13/734,164, filed Jan. 4, 2013, entitled "METHOD AND APPARATUS FOR ALLOWING SOFTWARE ACCESS TO NAVIGATIONAL DATA IN A DECRYPTED MEDIA STREAM WHILE PROTECTING STREAM PAYLOADS," which in turn is a continuation of U.S. patent application Ser. No. 12/586,618, filed Sep. 23, 2009, now U.S. Pat. No. 8,363,831, entitled "METHOD AND APPARATUS FOR ALLOWING SOFTWARE ACCESS TO NAVIGATIONAL DATA IN A DECRYPTED MEDIA STREAM WHILE PROTECTING STREAM PAYLOADS." The foregoing are hereby incorporated by reference in their entireties.

BACKGROUND

As digital content transmissions continue to proliferate through various aspects of day to day life, the issues surrounding protection of the content become increasingly important. Content may be transmitted to so-called "open" or "closed" platforms. A reference to an open or "untrusted" platform typically refers to a platform that places no security restrictions on applications that may be installed on it. A typical example of an open or untrusted platform is a personal computing (PC) device running Microsoft Windows. Any application written to conform to the Windows specification may be installed on the platform, without any regard to how safe the application may be. Although Microsoft has recently attempted to "close" the operating system, a PC running Microsoft Windows is still considered an open platform.

In contrast, closed platforms typically do not allow users to install arbitrary software. Examples of closed platforms include set top boxes such as TiVO and Apple's iPhone. In the scenario of TiVO, no applications may be installed on the device—it may simply receive, decrypt and render content. Similarly, although a variety of individuals and vendors may write applications that run on Apple's iPhone, only "approved" applications are made installable on the iPhone via Apple's App Store. Closed platforms thus have inherently built-in protection against malicious applications because the applications are trusted, i.e., from an authorized source.

Regardless of the type of platform, media content is typically encrypted for security purposes. Newer media formats and devices recognize discretely encrypted content, i.e., content in which the payload items are discretely encrypted and the navigational headers of the media stream are left unencrypted. As a result, regardless of whether it is an open or closed platform, the navigational headers are accessible without decryption and the encrypted payload portions can be decrypted independently from each other and from the navigational headers.

In contrast, if the media content is monolithically encrypted as is typical for older media formats and devices, the navigational headers and payload of the content stream are typically encrypted en masse. Thus, on those devices, the platform is forced to decrypt the entire content stream in order to access the navigational headers and play the content. While this poses little to no risk on a closed platform where all content and applications are presumed trusted, this scenario creates a significant security problem for untrusted platforms. One popular solution to this issue is for content providers to encrypt only the media payloads while leaving the header data in the clear. This allows the receiving device to access the headers for navigation purposes, while deferring payload decryption and decoding to the device hardware or other trusted environment.

BRIEF DESCRIPTION OF THE DRAWINGS

The present invention is illustrated by way of example and not limitation in the figures of the accompanying drawings in which like references indicate similar elements, and in which:

FIG. 4 is a flow chart illustrating an embodiment of the present invention.

DETAILED DESCRIPTION

Embodiments of the present invention provide a scheme for allowing software access to navigational data in a decrypted media stream while protecting stream payloads. As used in this specification, the phrases "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Additionally, reference in the specification to the term "device", "machine" or "apparatus" may include any one of a number of processor based computing devices, including but not limited to desktop computing devices, portable computing devices (laptops as well as handhelds), set-top boxes, and game consoles. Handheld devices may include, but are not limited to, personal digital assistants (PDAs), mobile internet devices (MIDs), laptops, digital cameras, media players, ultra mobile personal computers (UMPCs) and/or any computing device that is capable of roaming on, and connecting to, a network. Finally, the term "open platform" and "untrusted platform" may both refer to the same device and may be used interchangeably throughout the specification.

Figure 1:
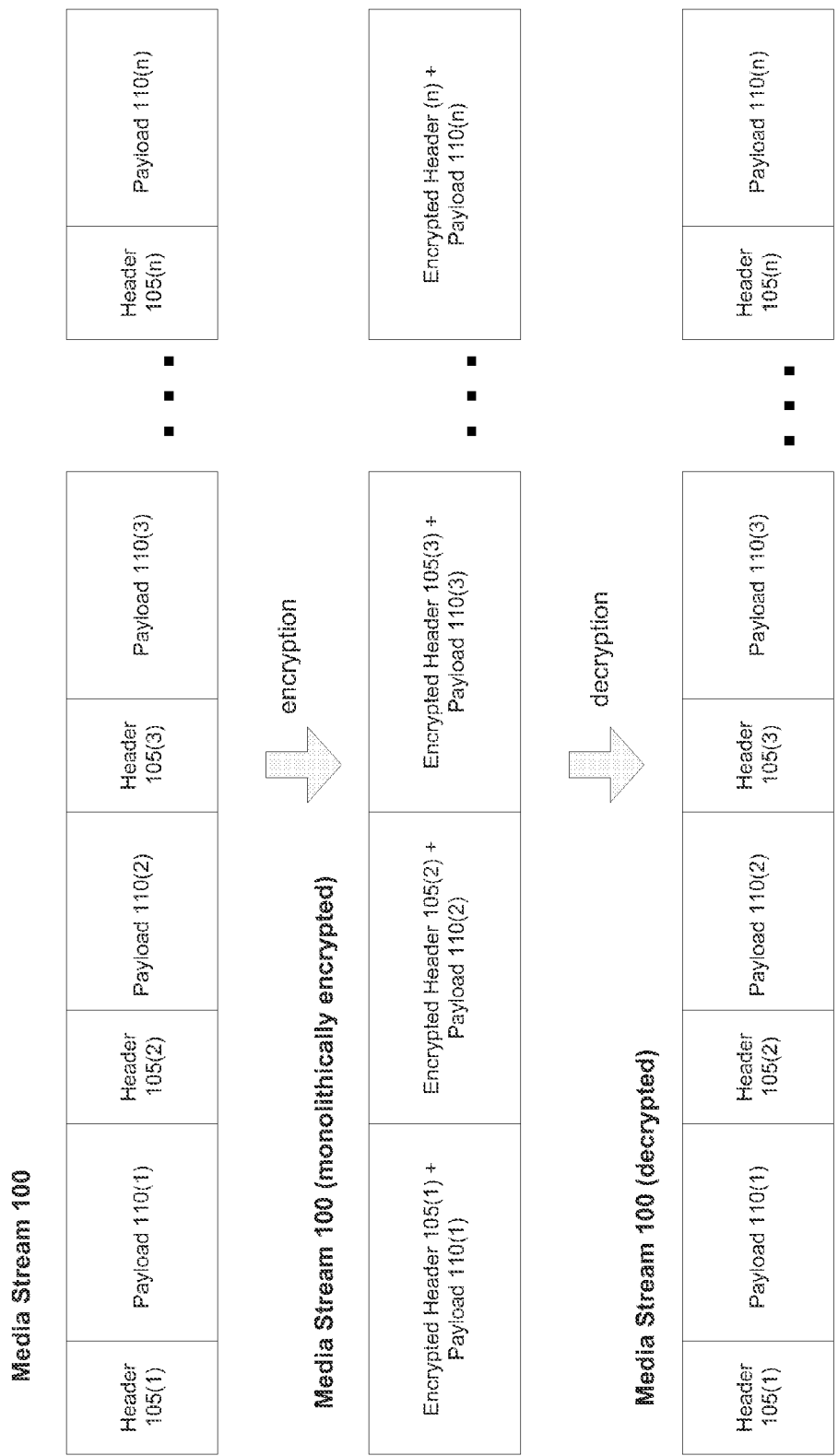
FIG. 1 illustrates an example of an encrypted media stream.

In one embodiment of the invention, an open platform may rely on trusted decryption of monolithically encrypted media streams to access the header fields while still having no meaningful access to the media payloads. A "monolithically encrypted" media stream typically includes a media stream wherein the payload and headers are encrypted together. This is in contrast with a "discretely encrypted" stream in which portions of the stream may be encrypted separately from each other and from the unencrypted headers. For purposes of illustration, FIG. 1 includes an example of a monolithically encrypted media stream. As shown, each segment of Media Stream 100 may include Headers 105 (1-n) and Payloads 110 (1-n). The Headers and Payloads may be encrypted prior to transmission and as each segment (1-n) is received by an untrusted media player, the segment may be decrypted. In existing systems, both Payloads 110 (1-n) and Headers 105

(1-n) would have to be decrypted in order to access the navigational information. Payloads 110 (1-n) may thereafter be vulnerable to attack.

Figure 2:
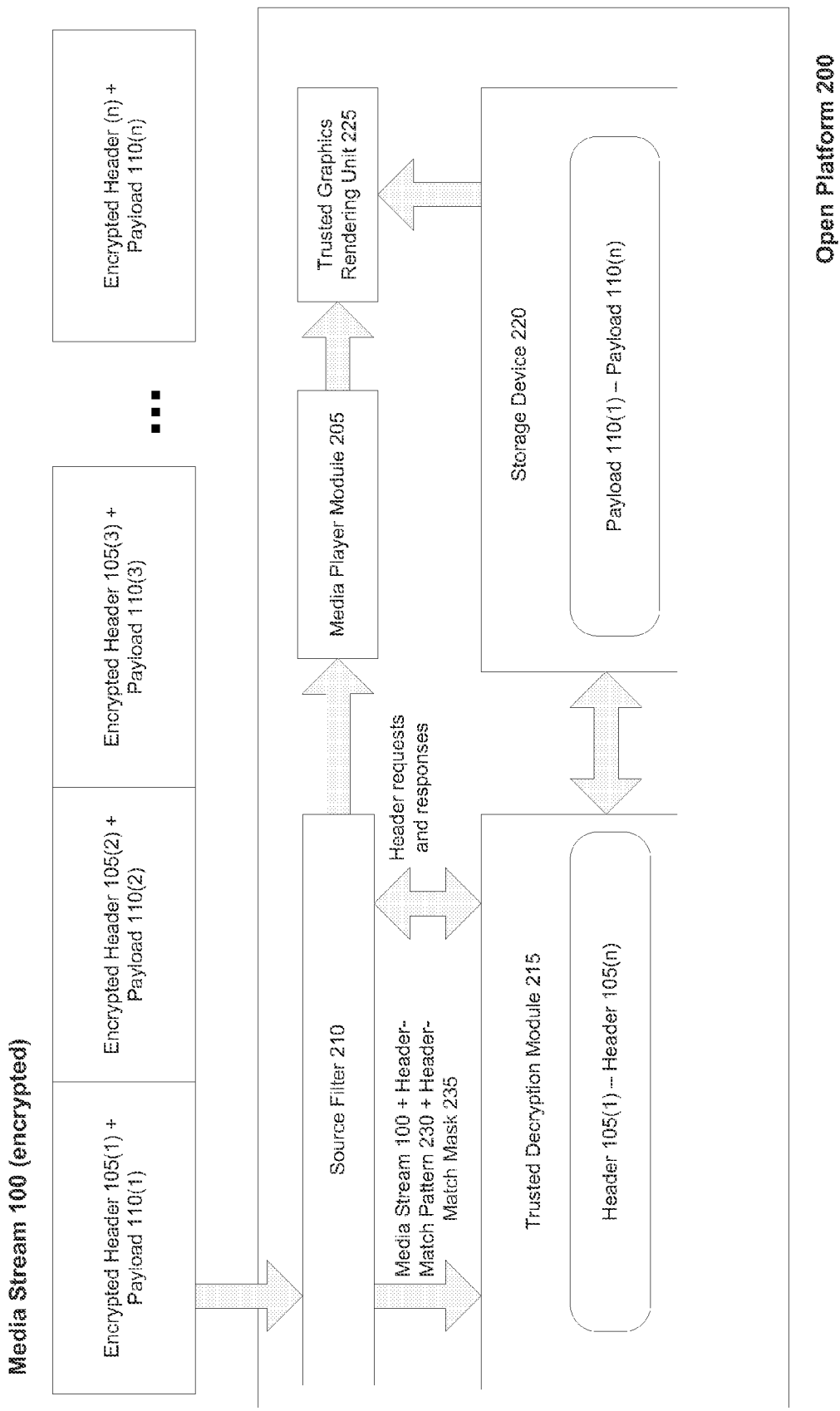
FIG. 2 illustrates a system according to an embodiment of the present invention.

In embodiments of the present invention, however, once decrypted, the navigational headers may be available to software running on the media player while the decrypted payload remains secure. FIG. 2 illustrates an example of an open platform that receives Media Stream 100 according to embodiments of the present invention. Specifically, Open Platform 200 comprises a media player module ("Media Player Module 205") coupled to Source Filter 210. Source Filter 210 may be coupled to a secure partition. In one embodiment, the secure partition may include Trusted Decryption Module 215, which in turn may be coupled to Storage Device 220. According to embodiments of the invention, Media Player Module may refer to a module capable of processing digital media. As such, Media Player Module may be implemented in software, hardware, firmware or a combination thereof.

According to various embodiments of the invention, Trusted Decryption Module 215 may include a Trusted Platform Module ("TPM"), Intel Corporation's Active Management Technologies ("AMT") and/or Intel's "Manageability Engine" ("ME") and/or other comparable or similar technologies. In one embodiment, Trusted Decryption Module 215 includes the capability to decrypt monolithically encrypted media streams and to store the resulting media data in Storage Device 220. According to embodiments of the present invention, Storage Device 220 is accessible by Trusted Decryption Module 215 via Source Filter 210 but not accessible by other software that may be running on Open Platform 200. Storage Device 220 may additionally be accessible by other trusted components on Open Platform 200, such as Trusted Graphics Rendering Unit 225 to process Payloads 110 (1-n). Although Trusted Graphics Rendering Unit 225 is illustrated herein, it is not a component necessary for embodiments of the present invention to function.

To further facilitate understanding of embodiments of the present invention, the following describes an example of how Open Platform 200 may handle an incoming monolithically encrypted media stream. Upon encountering Media Stream 100, Open Platform 200 may invoke Source Filter 210 to preprocess Media Stream 100. In one embodiment, Source Filter 210 may pass the Media Stream 100 or a portion of Media Stream 100 to Trusted Decryption Module 215. Trusted Decryption Module 215 may then decrypt Media Stream 100, restoring Headers 105 (1-n) and Payloads 110 (1-n).

In one embodiment, Trusted Decryption Module 215 may not include any intelligence to understand the type of media stream data it decrypts. In order to ensure that the media type is as expected, in one an embodiment, Source Filter 210 may send Header-Match Pattern 230 and Header-Match Mask 235 to Trusted Decryption Module 215, together with Media Stream 100. Source Filter 210 may additionally send other information, including encryption algorithm properties to Trusted Decryption Module 215. As described in further detail below, Trusted Decryption Module 215 may utilize the encryption algorithm properties to decrypt the media stream and then utilize Header-Match Pattern 230 and Header-Match Mask 235 to derive additional information about the stream. Based on the entire set of information available to Trusted Decryption Module 215, it may then determine whether the decrypted media stream may be accessed.

As discussed above, Trusted Decryption Module 215 may not include intelligence to determine the type of media stream it receives from Source Filter 210. Instead, Source Filter 210 may identify the media type and send the appropriate Header-Match Pattern 230 and Header-Match Mask 235 to Trusted Decryption Module 215. Trusted Decryption Module 215 may utilize Header-Match Pattern 230 and Header-Match Mask 235 to determine whether the expected navigation headers for the media type are met. If the decrypted headers match Header-Match Pattern 230 and Header-Match Mask 235, Trusted Decryption Module 215 may then enable a trusted component on the platform to render the content. Thus, for example, on a platform having Trusted Graphics Rendering Unit 225, Trusted Decryption Module 215 may enable Trusted Graphics Rendering Unit 225 to utilize decrypted Headers 105 (1-n) to navigate to decrypted Payload 110(1-n) in Storage Device 220 and render the content. The decrypted Payload 110(1-n) thus remains secure and inaccessible to components other than the trusted components on the platform. Once the headers are verified, they may be utilized by the untrusted components to navigate to the decrypted Payload 105(1-n) and render the payload without exposing the payload to untrusted components.

In one embodiment of the invention, Header-Match Pattern 230 includes a description of the expected pattern of bits that a media header for Media Stream 100 may match. The length of Header-Match Pattern 230 pattern may be bounded. Additionally, Header-Match Mask 235 may include a pattern of bits that may be ignored (so-called "don't care bits") because some bits may vary from header to header. In one embodiment, the number of "don't care" bits in Header-Match Mask 235 relative to the pattern length of Header-Match Pattern 230 may be utilized to determine whether to retrieve any of Media Stream 100 from Trusted Decryption Module 215. Thus, for example, Open Platform 200 may be configured such that if Header-Match Pattern 230 is too long or the number of "don't care" bits in Header-Match Mask 235 is too high, Trusted Decryption Module 215 may identify that combination of values as vulnerable to exposing payload data, return an error and not respond to subsequent retrieval requests. Source Filter 210 may provide the error appropriate to the underlying media stream format of Media Stream 100.

Figure 3:
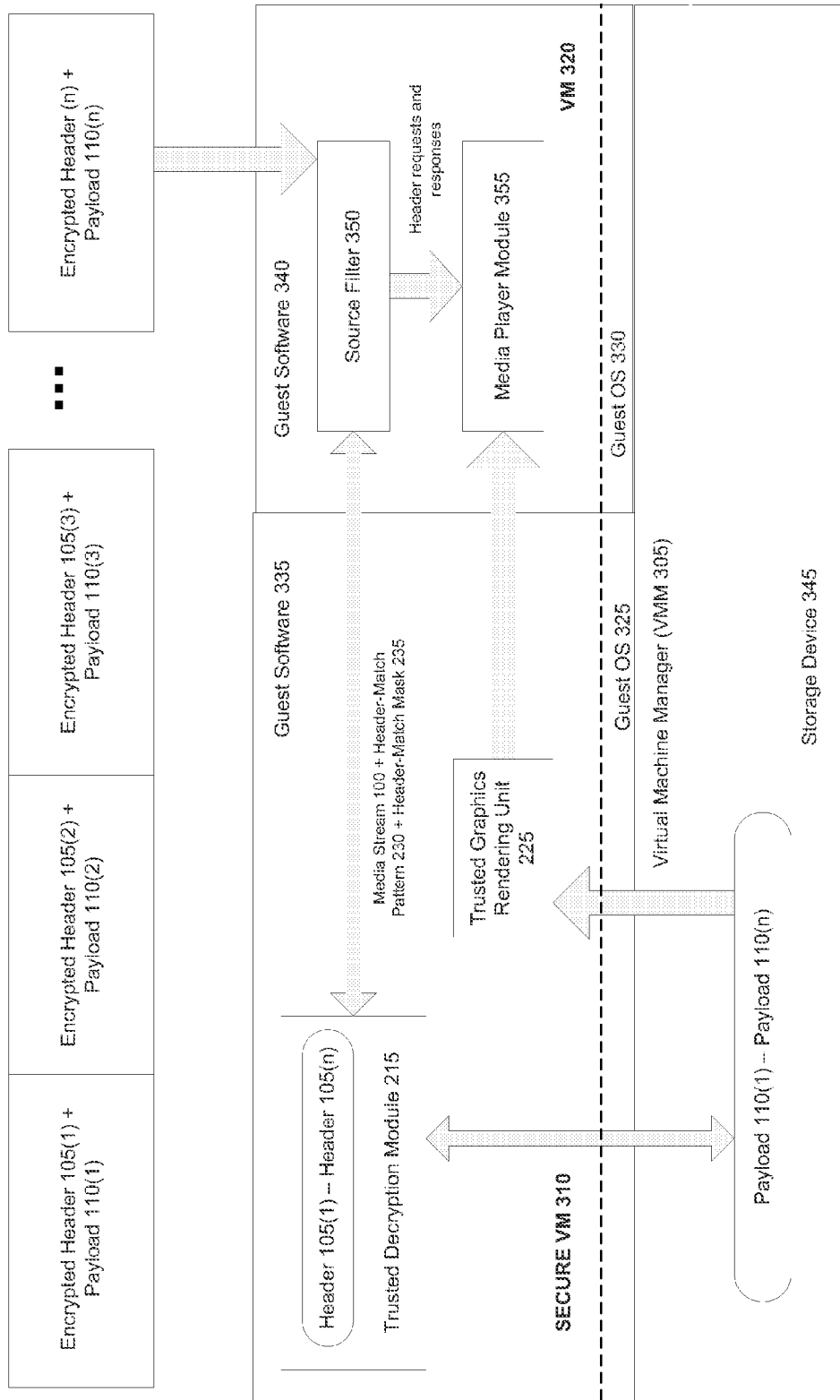
FIG. 3 illustrates an alternate system according to embodiments of the present invention.

In alternate embodiments, Trusted Decryption Module 215 may comprise secure software or virtual partitions such as a secure and isolated virtual machine or Intel Corporation's Secure Enclave technology. FIG. 3 is an example of a virtualized platform according to an embodiment of the present invention. Specifically, as illustrated, Open Platform 300 may include a virtual-machine monitor ("VMM 305") that presents an abstraction of the platform ("virtual machines" or "VMs") to other software on the platform. Although only two VM partitions are illustrated (310 and 320), these VMs are merely illustrative and any number of virtual machines may be configured on the host. VMM 305 may be implemented in software (e.g., as a standalone program and/or a component of a host operating system), hardware, firmware and/or any combination thereof.

Each VM may function as self-contained platforms respectively, running their own "pest operating systems" (illustrated as "Guest OS" 325 and 330) and other software (illustrated as "Guest Software" 335 and 340). Each Guest OS and/or Guest Software operates as if it were running on a dedicated computer rather than a virtual machine. In reality, VMM 305 has ultimate control over the events and hardware resources and allocates resources to the VMs according to its own policies.

According to embodiments of the present invention, one of the VMs may include trusted decryption software and be designated a secure and isolated security partition (the secure partition illustrated as "Secure VM 310"). Secure VM 310 may include Trusted Decryption Module 215, as well as Trusted Graphics Rendering Unit 225. Trusted Decryption Module 215 and Trusted Graphics Rendering Unit 225 may access Payload 110 (1-n) in Storage Device 345. VM 320, on the other hand, may be accessible to a user and include components such as Source Filter 350 and Media Player Module 355.

Upon detecting the media stream encryption in VM 320, Source Filter 350 may be invoked to preprocess Media Stream 100. In one embodiment, Source Filter 350 in VM 320 may pass Media Stream 100 or a portion of Media Stream 100 to Trusted Decryption Module 215 in Secure VM 310. Trusted Decryption Module 215 may then decrypt Media Stream 100, restoring Headers 105 (1-n) and Payloads 110 (1-n). Source Filter 350 may additionally send encryption algorithm properties, Header-Match Pattern 230 and Header-Match Mask 235 to Trusted Decryption Module 215, together with Media Stream 100. In one embodiment, Trusted Decryption Module 215 may utilize the encryption algorithm properties to decrypt the media stream and then utilize Header-Match Pattern 230 and Header-Match Mask 235 to derive additional information about the stream, as described in detail above. Based on the entire set of information available to Trusted Decryption Module 215, it may then determine whether the decrypted media stream may be accessed.

In one embodiment, if the decrypted media stream is deemed to be accessible to VM 320, Trusted Decryption Module 215 may enable Trusted Graphics Rendering Unit 225 to utilize decrypted Headers 105 (1-n) to navigate to decrypted Payload 110(1-n) in Storage Device 345 and Media Player Module 355 may then render the content in VM 320. As illustrated, VM 320 may not directly access payload 110 (1-n) or Storage Device 345. Payload 110(1-n) thus remains secure and inaccessible to partitions other than Secure VM 310.

FIG. 4 is a flow chart illustrating one embodiment of the present invention. Although the following operations may be described as a sequential process, many of the operations may in fact be performed in parallel and/or concurrently. In addition, one or more embodiments, the order of the operations may be re-arranged without departing from the spirit of embodiments of the invention. At 401, an open platform may receive a monolithically encrypted media stream comprising navigational headers and payloads. A source filter may identify the media type in 402, and recognize that the media is monolithically encrypted, at 403. The source filter may then send the encrypted media stream to a trusted component on the platform 404. In 405, the source filter may also send a header matching pattern and a header matching mask to the trusted component, suitable for the media type identified in 402.

Upon receipt of the monolithically encrypted media stream, the header match pattern and the header matching mask, the trusted component may decrypt the media stream into unencrypted headers and payloads in 406. The trusted component may thereafter determine whether the header matches the header match pattern and header match mask in 407. In 408, if the header matches, the trusted component may enable other trusted components to utilize the decrypted headers to access the decrypted payloads from the secure storage. If, however, the header does not match, the trusted component in 409 may refuse to fulfill any requests for the payload.

The scheme according to embodiments of the present invention may be implemented on a variety of computing devices. According to an embodiment, a computing device may include various other well-known components such as one or more processors which can be specialized Reduced Instruction Set Computer (RISC) engines or general purpose processing engines. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including Ethernet, Gigabit Ethernet, PC1, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
    receiving, by a source filter of a computing device, a monolithically encrypted media stream;
    identifying, by the source filter, a media type of the monolithically encrypted media stream and header parameters associated with the media type; and
    providing, by the source filter, to a trusted decryption module, the monolithically encrypted media stream with a header-match pattern and a header-match mask, to decrypt the media stream, wherein the header-match pattern contains a description of an expected pattern of bits in a header of the media stream, and wherein the header-match mask contains a pattern of bits to be ignored if present in the header of the media stream.

2. The method of claim 1, further comprising:
    receiving, by the trusted decryption module operating in a secure partition of the computing device, the monolithically encrypted media stream with the header-match pattern and the header-match mask;
    decrypting the media stream, by the trusted decryption module, to derive decrypted header data and decrypted payload data; and
    conditionally storing the decrypted payload data, in a secure data storage accessible to a trusted component, if the decrypted header data matches the header-match pattern and the header-match mask.

3. The method of claim 2, further comprising:
    enabling, by the trusted decryption module, the trusted component to navigate to the decrypted payload data stored in the secure data storage.

4. The method of claim 3, wherein the trusted component includes a trusted graphics processing unit.

5. The method of claim 3, wherein navigating to the decrypted payload data stored in the secure data storage includes:
    retrieving the decrypted payload data; and
    processing the decrypted payload data according to the media type of the media stream.

6. The method of claim 5, wherein:
the media type is graphics;
the secure trusted component comprises a trusted graphics processing unit; and
processing the decrypted payload data according to the media type of the media stream includes processing the decrypted payload data to render and display graphics of the media stream.

7. The method of claim 2, wherein the secure partition comprises one of a Trusted Platform Module (TPM), a Management Engine (ME) or an Active Management Technologies (AMT) partition.

8. The method of claim 2, wherein the secure partition includes a virtual partition running on a virtualized host.

9. An apparatus, comprising:
a source filter module to receive a monolithically encrypted media stream, identify a media type of the monolithically encrypted media stream and header parameters associated with the media type, and output the encrypted media stream with a header-match pattern and a header-match mask, wherein the header-match pattern contains a description of an expected pattern of bits in a header of the media stream, and wherein the header-match mask contains a pattern of bits to be ignored if present in the header of the media stream; and
a trusted decryption module in a secure partition, coupled with the source filter module, to receive and decrypt the media stream in the secure partition to derive decrypted header data and decrypted payload data.

10. The apparatus of claim 9, further comprising:
a secure data storage module, coupled to the trusted decryption module, to enable the trusted decryption module to conditionally store the decrypted payload data in the secure data storage module if the decrypted header data matches the header-match pattern and the header-match mask.

11. The apparatus of claim 10, wherein the trusted decryption module is further to enable a trusted component to navigate to the decrypted payload data stored in the secure data storage module.

12. The apparatus of claim 11, wherein the trusted component includes a trusted graphics processing unit.

13. The apparatus of claim 11, wherein navigate to the decrypted payload data stored in the secure data storage module includes:
retrieve the decrypted payload data; and
process the decrypted payload data according to the media type.

14. The apparatus of claim 13, wherein:
the media type is graphics;
the trusted component comprises a trusted graphics processing unit; and
the trusted graphics processing unit is to process the decrypted payload data according to the media type and to render and display graphics in the media stream.

15. The apparatus of claim 10, wherein the secure partition is one of a Trusted Platform Module (TPM), a Management Engine (ME) or an Active Management Technologies (AMT) partition.

16. The apparatus of claim 10, wherein the secure partition includes a virtual partition running on a virtualized host.

17. The apparatus of claim 10, further comprising:
a media player module to play the media stream with assistance from a trusted component in accessing the decrypted payload data stored in the secure data storage module.

18. At least one non-transitory machine accessible medium having stored thereon instructions that, when executed by one or more processing devices of a machine, cause the machine to provide a source filter to:
receive a monolithically encrypted media stream;
identify a media type of the monolithically encrypted media stream and header parameters associated with the media type; and
pass the encrypted media stream to a trusted decryption module with a header-match pattern and a header-match mask, wherein the header-match pattern contains a description of an expected pattern of bits in a header of the media stream, and wherein the header-match mask contains a pattern of bits to be ignored if present in the header of the media stream.

19. The at least one non-transitory machine accessible medium of claim 18, wherein the instructions, when executed by the one or more processing devices of the machine, further cause the machine to provide the trusted decryption module, in a secure partition, to:
receive the encrypted media stream with the header-match pattern and the header-match mask;
decrypt the media stream in the secure partition to derive decrypted header data and decrypted payload data; and
conditionally store the decrypted payload data, in a secure data storage accessible to a trusted component, if the decrypted header data matches the header-match pattern and the header-match mask.

20. The at least one non-transitory machine accessible medium of claim 19, wherein the trusted decryption module is further configured to enable the trusted component to navigate to the decrypted payload data stored in the secure data storage.

21. The at least one non-transitory machine accessible medium of claim 19, wherein the trusted component comprises a trusted graphics processing unit.

22. The at least one non-transitory machine accessible medium of claim 20, wherein navigate to the decrypted payload data stored in the secure data storage includes:
retrieve the decrypted payload data; and
process the decrypted payload data according to the media type.

23. The at least one non-transitory machine accessible medium of claim 22, wherein:
the media type is graphics;
the trusted component comprises a trusted graphics processing unit; and
the trusted graphics processing unit is to process the decrypted payload data according to the media type and to render and display graphics of the media stream.

24. The at least one non-transitory machine accessible medium of claim 19, wherein the secure partition comprises one of a Trusted Platform Module (TPM), a Management Engine (ME) or an Active Management Technologies (AMT) partition.

25. The at least one non-transitory machine accessible medium of claim 19, wherein the secure partition includes a virtual partition running on a virtualized host.

* * * * *